United States Patent [19]

Kluger et al.

[11] 4,330,660
[45] May 18, 1982

[54] SUBSTITUTED 1,2-DIAMINOCYCLOHEXANES AND USE AS EPOXY CURING AGENTS

[75] Inventors: Edward W. Kluger, Pauline; Tien-Kuei Su, Spartanburg, both of S.C.

[73] Assignee: Milliken Research Corporation, Spartanburg, S.C.

[21] Appl. No.: 225,842

[22] Filed: Jan. 16, 1981

[51] Int. Cl.³ .............................................. C08G 59/64
[52] U.S. Cl. .................................... 528/111; 528/407
[58] Field of Search ................ 564/461; 528/111, 407

[56] References Cited

U.S. PATENT DOCUMENTS

| | | | |
|---|---|---|---|
| 2,897,179 | 7/1959 | Schechter et al. | 528/407 X |
| 3,112,345 | 11/1963 | Stansbury et al. | 528/111 X |
| 3,378,503 | 4/1968 | Speranza et al. | 528/407 X |
| 3,625,918 | 12/1971 | Meer et al. | 528/407 X |
| 4,153,567 | 5/1979 | Kluger et al. | 252/51.5 A |

Primary Examiner—Earl A. Nielsen
Attorney, Agent, or Firm—H. William Petry; Terry T. Moyer

[57] ABSTRACT

Nitrogen-containing compounds are provided having the following formula:

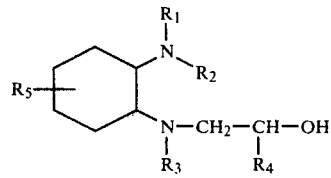

where $R_1$, $R_2$ and $R_3$ are independently selected from H and

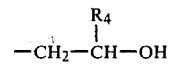

wherein $R_4$ and $R_5$ are each independently selected from H and a lower alkyl group having from 1 to about 4 carbon atoms.

12 Claims, No Drawings

SUBSTITUTED 1,2-DIAMINOCYCLOHEXANES AND USE AS EPOXY CURING AGENTS

The present invention relates to certain nitrogen-containing compounds and to epoxy resin compositions containing an epoxy resin and an amine-containing epoxy resin curing agent.

Epoxy resins were first introduced commercially in the United States in about 1950, and since then their use has grown rapidly. Epoxy resins may be broadly defined as resinous intermediate materials which are characterized by the presence of the epoxy group.

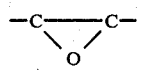

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides, tertiary amines, and amine adducts. The novel nitrogen-containing compounds of the present invention may be employed as the third type, namely the amine type, of epoxy curing agent.

The nitrogen-containing compounds of the present invention may be represented by the following structural formula:

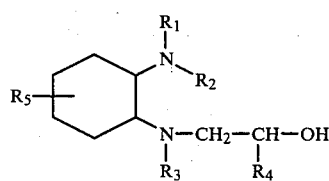

where $R_1$, $R_2$ and $R_3$ are independently selected from H and

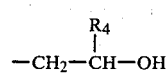

wherein $R_4$ and $R_5$ are each independently selected from H and a lower alkyl group having from 1 to about 4 carbon atoms. Preferably in the above structural formula $R_1$, $R_2$ and $R_3$ are H; $R_4$ is selected from H and methyl; and $R_5$ is selected from H and a lower alkyl group having from 1 to about 4 carbon atoms. The most preferred compounds within the scope of the present invention are N-(-2-hydroxyethyl)-1,2-diaminocyclohexane, and N-(-2-hydroxypropyl)-1,2-diaminocyclohexane.

The present invention also relates to epoxy resin compositions, both curable and cured which contain about 100 parts of at least one epoxy resin and from about 20 parts to about 40 parts, preferably about 25 to about 35 parts by weight of at least one epoxy resin curing agent having the above structural formula. Also within the scope of the present invention are methods for curing epoxy resins wherein the novel nitrogen-containing compounds of the present invention may be employed as a curing agent. Curing may be accomplished at room temperature which is desirable in certain applications. The cured epoxy resin compositions of the present invention have been found to be resistant to undesired amine carbonate formation in the presence of air under both dry and humid conditions. The cured epoxy resin compositions of the present invention also desirably tend to be resistant to yellowing in the presence of air under a wide variety of humidity conditions.

Preparation of the novel nitrogen-containing compounds of the present invention may be accomplished quite conveniently by the hydroxyalkylation of 1,2-diaminocyclohexane with a suitable alkylene oxide, preferably ethylene oxide, propylene oxide or mixtures of ethylene oxide and propylene oxide. Such reaction may be accomplished under suitable hydroxyalkylation conditions both in the presence or absence of a suitable solvent.

For convenience the method of preparation will be described with particular reference to the preferred nitrogen-containing compounds of the invention although it should be understood that the invention is not to be limited thereby.

The hydroxyalkylation reaction by means of which the novel compounds of the present invention may be prepared in high yields is set forth below:

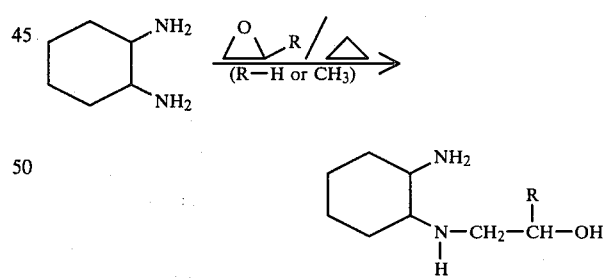

The temperature at which the above hydroxyalkylation may be carried out can vary widely. Generally, however, the temperature may be within a range of from about 70°–130° C. and preferably in the range of 80°–100° C. Likewise, the period of time required for the reaction to go to substantial completion can vary widely, such being dependent on the alkylene oxide concentration (pressure in psi), whether a solvent is used, as well as the temperature at which such reaction may be carried out. Generally, however, the reaction proceeds to completion when the reactants are contacted at the required temperature for a period of time from about 30 minutes to about 5 hours. The hydroxyalkylation can be carried out in the presence or absence of a solvent. When solvent is employed, any suitable solvent which will not interfere with the desired hydroxyalkylation can be employed, such as cycloaliphatic ethers, e.g., dioxane, tetrahydrofuran, and the like, and higher boiling hydrocarbons, e.g., hexane, cyclohexane, heptane, decane, toluene, xylenes, and the like.

One particularly important use for the novel nitrogen-containing compounds of the present invention is their use as epoxy curing agents for polyepoxides. The polyepoxides which can be cured at elevated temperatures using the amino compounds as herein described are those polyepoxides possessing at least two

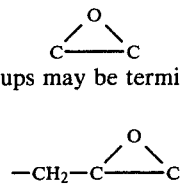

groups. These groups may be terminal, i.e., $$-CH_2-C\overset{O}{\underset{}{\diagdown\!\!\!\!\diagup}}C$$

groups, or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described nitrogen-containing compounds of the present invention may be accomplished by simply mixing the two components together. While the reaction between the two components may occur slowly at room temperature, improved results can be obtained if the mixture is heated to a temperature of from about 50° C. to about 280° C. for a period of time of from about 1 to about 12 hours and thereafter post-curing the reaction product for an additional period of time from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel amino compound curing agent by evaporation before and/or during the curing of such polyepoxide composition can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ethers of ethylene glycol and chlorinated hydrocarbons, such as chloroform.

In addition to the use of the nitrogen-containing compounds of the present invention as epoxy curing agents, many other uses can readily be envisioned by those skilled in the art. Thus, not only do the compounds of the present invention find utility as epoxy curing agents but such compositions can be employed as oil and fuel adductive intermediates. Further, the polyamines may be employed for the formation of diisocyanate compositions for the incorporation into polyurethane compositions, and the compound may be further reacted to form novel and useful polyamides.

In order to more fully describe the preparation and use of the novel compounds of the present invention the following examples are given. However, such examples are presented for illustration only and are not to be construed as unduly limiting the scope of the present invention. Unless otherwise indicated, all parts and/or percentages given in these examples are by weight.

EXAMPLE 1

In a 1 gallon stirred autoclave (purged with nitrogen) was charged 2988.2 gm. (26.2 moles) of 1,2-diaminocyclohexane. The autoclave was sealed and purged 3 times with 60 psi of nitrogen. Afterwards, the reaction was heated to 100° C. and pressured to 10 psi with nitrogen. A total of 385 gm. (8.75 moles) of ethylene oxide was added gradually to the autoclave such that the total reaction pressure did not exceed 60 psi at 100° C. After all the ethylene oxide was added to the autoclave was post heated at 120° C. for 2 hours. The autoclave was then cooled to 40° C. and the excess volatiles were stripped under vacuum (15–30 mmHg) for 20 minutes. The excess 1,2-diaminocyclohexane was then removed under vacuum (15–30 mmHg) to give a crude product consisting of 88 percent N-(-2-hydroxyethyl)-1,2-diaminocyclohexane and 12 percent of N,N'-di-(-2-hydroxyethyl)-1,2,-diaminocyclohexane (GLC-mass spectrum analysis). The crude product was further distilled under vacuum (15–20 mmHg) at a temperature of 185°–190° C. to obtain the corresponding liquid N-(-2-hydroxyethyl)-1,2-diaminocyclohexane in high purity (100 percent by GLC). A potentiometric titration of the product with 1N HCl resulted in a neutralization equivalent of 12.58 milliequivalents of HCl per gm. of product. The theoretical value for N-(-2-hydroxyethyl)-1,2-diaminocyclohexane (mwt.=158.25) was calculated to be 12.64 milliequivalents of HCl per gm. of diamine which is in excellent agreement with the observed experimental value. The elemental analysis was also in agreement with the N-(-2-hydroxyethyl)-1,2-diaminocyclohexane:

Calculation for $C_8H_{18}N_2O$: C, 60.76%; H, 11.39%; N, 17.72%. Found: C, 60.04%; H, 11.48%; N, 17.69%.

EXAMPLE 2

In a 1 gallon stirred autoclave (purged with nitrogen) was charged 2330.7 gms. (20.44 moles) of 1,2-diaminocyclohexane. The autoclave was sealed and purged 3 times with 60 psi of nitrogen. Afterwards, the reaction was heated to 100° C. and pressured to 10 psi with nitrogen. A total of 395 gms. (6.81 moles) of propylene oxide was added gradually to the autoclave such that the total reaction pressure did not exceed 60 psi at 100° C. After all the propylene oxide was added the autoclave was post heated at 120° C. for 2 hours. The autoclave was then cooled to 40° C. and the excess volatiles were stripped under vacuum (15–30 mmHg) for 20 minutes. The excess 1,2-diaminocyclohexane was then removed under vacuum (15–30 mmHg) to give a crude product consisting of 88.5 percent N-(-2-hydroxypropyl)-1,2-diaminocyclohexane and 11.5 percent of N,N'-Di-(-2-hydroxypropyl)-1,2-diaminocyclohexane (GLC-mass spectrum analysis). The crude product was further distilled under vacuum (15–20 mmHg) at a temperature of 175°–178° C. to obtain the corresponding liquid N-(-2-hydroxypropyl)-1,2-diaminocyclohexane in high purity (100 percent by GLC). A potentiometric titration of the product with 1N HCl resulted in a neutralization equivalent of 11.47 milliequivalents of HCl per gm. of product. The theoretical value for N-(-2-hydroxypropyl)-1,2-diaminocyclohexane (mwt.=172.27) was calculated to be 11.61 milliequivalents of HCl per gm. of diamine which is in excellent agreement with the observed experimental value. The elemental analysis was also in agreement with the N-(-2-hydroxypropyl)-1,2-diaminocyclohexane:

Calculation for $C_9H_{20}N_2O$: C, 62.79%, H, 11.63%; N, 16.28%. Found: C, 62.99%; H, 11.84%; N, 16.56%.

EXAMPLE 3

To five beakers each containing 100 parts of epoxy resin based on diglycidyl ether of bisphenol A (n=0.2, wpe=185–195) were added the corresponding parts of

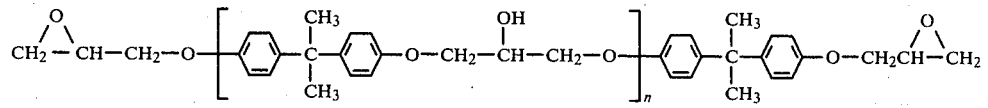

N-(-2-hydroxyethyl)-1,2-diaminocyclohexane prepared in Example 1: 27.5 parts, 28.0 parts, 28.5 parts, 29.0 parts, and 29.5 parts. After mixing each beaker thoroughly for 2 minutes and centrifuging at a speed of 3000 rpm., these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the table below:

| GLASS TRANSITION TEMPERATURE FOR N-(-2-HYDROXYETHYL)-1,2-DIAMINOCYCLOHEXANE | | |
|---|---|---|
| ENTRY | PHR | TG (°C.) |
| 1 | 27.5 | 128.0 |
| 2 | 28.0 | 130.0 |
| 3 | 28.5 | 132.0 |
| 4 | 29.0 | 130.5 |
| 5 | 29.5 | 130.0 |

EXAMPLE 4

To a beaker containing 100 parts of epoxy resin based on diglycidyl ether with bisphenol A (n=0.2, wpe=1-85–195)

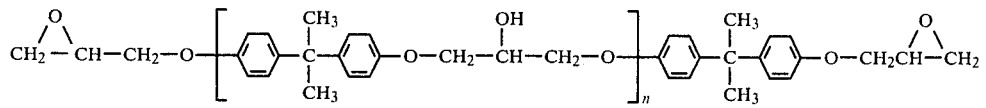

was added 32.0 parts of N-(-2-hydroxypropyl)-1,2-diaminocyclohexane prepared in Example 2. After mixing thoroughly for 2 minutes and centrifuging at a speed of 3000 rpm., the resin mixture was placed in an aluminum mold and was cured for 2 hours at 80° C. and for another 2 hours at 150° C. The crosslinked product had a glass transition temperature of 118.8° C. as measured with a differential scanning calorimeter (Perkin Elmer Model DSC-2).

EXAMPLE 5

A small sample of 1,2-diamino-cyclohexane, and both N-(-2-hydroxyethyl)-1,2-diaminocyclohexane and N-(-2-hydroxypropyl)-1,2-diaminocyclohexane was placed in three separate vials and was exposed to a humid air atmosphere. Within one day the 1,2-diaminocyclohexane containing vial started turning orange and forming a solid residue (-amine carbonate). Over the course of one week the 1,2-diaminocyclohexane containing vial had completely solidified and turned dark purplish black. In contrast, the vials containing both the N-(-2-hydroxyethyl)-1,2-diaminocyclohexane and the N-(-2-hydroxypropyl)-1,2-diaminecyclohexane appeared unaffected by the exposure during one day. Even after one week these samples only turned slightly more yellow and no solid residue had formed.

The above examples clearly indicate the preparation of the novel compounds of the present invention. Furthermore, Examples 3 through 4 illustrate the use of N-(-2-hydroxyethyl) and N-(-2-hydroxypropyl)-1,2-diaminocyclohexanes as non-yellowing and carbonate resistent epoxy curing agents.

What is claimed is:

1. Nitrogen-containing compounds having the following formula:

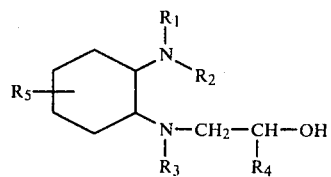

where $R_1$, $R_2$ and $R_3$ are independently selected from H and

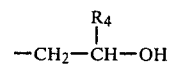

wherein $R_4$ and $R_5$ are each independently selected from H and a lower alkyl group having from 1 to about 4 carbon atoms.

2. The nitrogen-containing compounds of claim 1, wherein $R_1$, $R_2$ and $R_3$ are H; $R_4$ is selected from H and methyl; and $R_5$ is selected from H and a lower alkyl group having from 1 to about 4 carbon atoms.

3. N-(-2-hydroxyethyl)-1,2-diaminocyclohexane.

4. N-(-2hydroxypropyl)-1,2-diaminocyclohexane.

5. An epoxy resin composition comprising an epoxy resin and at least one epoxy resin curing agent of the formula:

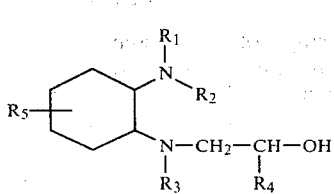

where $R_1$, $R_2$ and $R_3$ are independently selected from H and

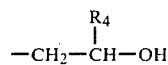

wherein $R_4$ and $R_5$ are each independently selected from H and a lower alkyl group having from 1 to about 4 carbon atoms.

6. The epoxy resin composition of claim 5, wherein said epoxy resin is selected from the polyepoxides having at least two

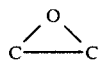

groups.

7. The epoxy resin composition of claim 6, wherein said

groups are terminal groups.

8. The epoxy resin composition of claim 7, wherein said epoxy resin is a diglycidyl ether of bis-phenol.

9. The epoxy resin composition of claim 5, wherein the epoxy resin curing agent is represented by the general formula set forth in claim 5 and where $R_1$, $R_2$ and $R_3$ are H; $R_4$ is selected from H and methyl; and $R_5$ is selected from H and a lower alkyl group having from 1 to about 4 carbon atoms.

10. The epoxy resin composition of claim 5, wherein the epoxy resin curing agent is N-(-2-hydroxyethyl)-1,2-diaminocyclohexane.

11. The epoxy resin composition of claim 5, wherein the epoxy resin curing agent is N-(-2-hydroxypropyl)-1,2-diaminocyclohexane.

12. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

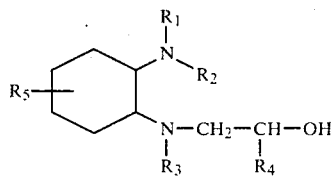

where $R_1$, $R_2$ and $R_3$ are independently selected from H and

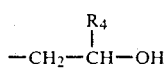

wherein $R_4$ and $R_5$ are each independently selected from H and a lower alkyl group having from 1 to about 4 carbon atoms.

* * * * *